(12) United States Patent
Davies (10) Patent No.: US 11,726,230 B2
(45) Date of Patent: Aug. 15, 2023

(54) SUBSURFACE STRAIN ESTIMATION USING FIBER OPTIC MEASUREMENT

(71) Applicant: CHEVRON U.S.A. INC., San Ramon, CA (US)

(72) Inventor: Kevin John Davies, Cambridge (GB)

(73) Assignee: CHEVRON U.S.A. INC., San Ramon, CA (US)

( * ) Notice: Subject to any disclaimer, the term of this patent is extended or adjusted under 35 U.S.C. 154(b) by 353 days.

(21) Appl. No.: 17/160,636

(22) Filed: Jan. 28, 2021

(65) Prior Publication Data

US 2022/0236445 A1 Jul. 28, 2022

(51) Int. Cl.
| | | |
|---|---|---|
| G01V 8/24 | (2006.01) | |
| G01L 1/24 | (2006.01) | |
| E21B 49/00 | (2006.01) | |
| E21B 47/005 | (2012.01) | |
| E21B 47/007 | (2012.01) | |
| E21B 33/14 | (2006.01) | |

(52) U.S. Cl.
CPC ............... *G01V 8/24* (2013.01); *E21B 33/14* (2013.01); *E21B 47/005* (2020.05); *E21B 47/007* (2020.05); *E21B 49/00* (2013.01); *G01L 1/242* (2013.01); *E21B 2200/20* (2020.05)

(58) Field of Classification Search
CPC ...... E21B 2200/20; E21B 33/14; E21B 49/00; G01V 8/24; G01L 1/242
See application file for complete search history.

(56) References Cited

U.S. PATENT DOCUMENTS

| | | | |
|---|---|---|---|
| 5,289,433 A | 2/1994 | Cowles | |
| 5,343,001 A | 8/1994 | Cowles | |
| 7,242,637 B2 | 7/2007 | Van Den Beukel | |
| 9,103,940 B2 | 8/2015 | Hatchell | |
| 9,217,804 B2 | 12/2015 | Hatchell | |
| 9,581,709 B2 | 2/2017 | Hatchell | |
| 9,915,579 B1 * | 3/2018 | Brower | G01L 11/025 |
| 10,451,475 B2 * | 10/2019 | Dean | G01H 9/004 |
| 2010/0042326 A1 | 2/2010 | Bourne | |
| 2010/0312480 A1 | 12/2010 | Hansteen | |
| 2011/0046934 A1 | 2/2011 | Hatchell | |
| 2011/0139462 A1 | 6/2011 | Bourne | |
| 2017/0082779 A1 * | 3/2017 | Haukås | G01V 99/005 |

FOREIGN PATENT DOCUMENTS

WO 2008087174 7/2008

OTHER PUBLICATIONS

Hatchell et al., "Rocks under strain: Strain-induced time-lapse time shifts are observed for depleting reservoirs", The Leading Edge Dec. 2005 (Year: 2005).*
Jousset et al., "Dynamic strain determination using fibre-optic cables allows imaging of seismological and structural features", Nature Communications | (2018) 9:2509 (Year: 2018).*
(Continued)

*Primary Examiner* — Regis J Betsch
(74) *Attorney, Agent, or Firm* — Esplin & Associates, PC (57) ABSTRACT

Strain and time-strain measurement in a well enables derivation of a constant that links the two. Knowledge of the constant along with time-strain measurement at another well enables estimation of strain at the other well.

18 Claims, 4 Drawing Sheets

(56) References Cited

OTHER PUBLICATIONS

Doetsch et al., "Subsurface Fluid Pressure and Rock Deformation Monitoring Using Seismic Velocity Observations", Geophysical Research Letters • Sep. 2018 (Year: 2018).*
Hatchell, P. & Bourne, S. [2005] Rocks under strain: Strain-induced time-lapse time shifts are observed for depleting reservoirs. The Leading Edge, 24, 1222-1225.
Davies [2020] Fiber Optics for Sub-Surface Strain Forecasting. First EAGE Workshop on Fibre Optic Sensing for Reservoir and Production Monitoring Mar. 9-11, 2020 | Amsterdam, The Netherlands, 5 pages.
Ivan Lim Chen Ning & Paul Sava, High-resolution multicomponent distributed acoustic sensing, Center for Wave Phenomena, Colorado School of Mines, 2017 (12 pages).
M. Cannon and P. Kole, Shell and NAM BV. The First Year of Distributed Strain Sensing (DSS) Monitoring in the Groningen Gas Field, Jun. 2018 (78 pages).

* cited by examiner

SUBSURFACE STRAIN ESTIMATION USING FIBER OPTIC MEASUREMENT

The present disclosure relates generally to the field of estimating strain along a well using fiber optic measurement.

BACKGROUND

Strain measurement at a well may be used to perform subsurface analysis, such as for calibration and verification of mechanical earth models or for well integrity analysis. The structure of a well may not allow for placement of a fiber optic cable to perform direct measurement of strain along the well.

SUMMARY

This disclosure relates to estimating strain along a well. Time-strain information of a well, velocity-strain per strain information for the well, and/or other information may be obtained. The time-strain information of the well may characterize time-strain of the well as a function of distance along the well. The time-strain of the well may be measured via an interior fiber optic cable within the well. The well may be adjacent to one or more types of rock, such as a first type of rock and/or other types of rock. The velocity-strain per strain information for the well may characterize one or more values of velocity-strain per strain corresponding to the type(s) of rock adjacent to the well. The value(s) of velocity-strain per strain may include a first value of velocity-strain per strain corresponding to the first type of rock adjacent to the well. The first value of velocity-strain per strain may be determined based on fiber optic measurement of time-strain and strain of another well different from the well, and/or other information. The strain of the well as the function of distance along the well may be estimated based on (1) the time-strain of the well as the function of distance along the well, (2) the value(s) of velocity-strain per strain corresponding to the type(s) of rock adjacent to the well, and/or other information. The strain of the well adjacent to the first type of rock may be estimated based on the time-strain of the well along the first type of rock, the first value of velocity-strain per strain corresponding to the first type of rock, and/or other information.

A system for estimating strain along a well may include one or more electronic storage, one or more processors and/or other components. The electronic storage may store information relating to one or more wells, information relating to strain, time-strain information, information relating to time-strain, information relating to velocity-strain, velocity-strain information, information relating to velocity-strain per strain, information relating to one or more types of rock, and/or other information.

The processor(s) may be configured by machine-readable instructions. Executing the machine-readable instructions may cause the processor(s) to facilitate estimating strain along a well. The machine-readable instructions may include one or more computer program components. The computer program components may include one or more of a time-strain information component, a velocity-strain per strain information component, a strain component, and/or other computer program components.

The time-strain information component may be configured to obtain time-strain information of a well and/or other information. The time-strain information may characterize time-strain of the well as a function of distance along the well. The time-strain of the well may be measured via one or more interior fiber optic cables within the well. The well may be adjacent to one or more types of rock. The type(s) of rock adjacent to the well may include a first type of rock and/or other types of rock.

In some implementations, interior fiber optic cable(s) may be positioned within a casing of the well. In some implementations, the interior fiber optic cable(s) may be clamped to a tubing of the well. In some implementations, the interior fiber optic cable(s) may be located within the tubing of the well. In some implementations, the well may not include an exterior fiber optic cable coupled to the type(s) of rock adjacent to the well.

The velocity-strain per strain information component may be configured to obtain velocity-strain per strain information for the well, and/or other information. The velocity-strain per strain information may characterize one or more values of velocity-strain per strain corresponding to the type(s) of rock adjacent to the well. The value(s) of velocity-strain per strain may include a first value of velocity-strain per strain corresponding to the first type of rock adjacent to the well. The first value of velocity-strain per strain may be determined based on fiber optic measurement of time-strain and strain of another well different from the well.

In some implementations, one or more exterior fiber optic cables may be positioned outside a casing of the other well. The exterior fiber optic cable(s) may be coupled to the first type of rock adjacent to the other well. The strain of the other well may be measured via the exterior fiber optic cable(s). In some implementations, the exterior fiber optic cable(s) may be coupled to the first type of rock adjacent to the other well via cementing of the exterior fiber optic cable(s) between the casing of the other well and the first type of rock adjacent to the other well.

In some implementations, the time-strain of the other well may be measured via the exterior fiber optic cable(s) of the other well. In some implementations, the time-strain of the other well may be measured via one or more interior fiber optic cables within the other well.

In some implementations, one or more fiber optic strain sensors may be positioned at one or more locations along the exterior fiber optic cable(s) of the other well. The fiber optic strain sensor(s) may be configured to measure helical strain at the location(s) along the exterior fiber optic cable(s).

The strain component may be configured to estimate the strain of the well as the function of distance along the well. The strain of the well may be estimated based on (1) the time-strain of the well as the function of distance along the well, (2) the value(s) of velocity-strain per strain corresponding to the type(s) of rock adjacent to the well, and/or other information. The strain of the well adjacent to the first type of rock may be estimated based on the time-strain of the well along the first type of rock, the first value of velocity-strain per strain corresponding to the first type of rock, and/or other information.

In some implementations, one or more mechanical earth models may be calibrated and/or verified for subsurface strain forecasting based on the strain of the well, and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to estimating strain along a well. Strain and time-strain measurement in a well enables derivation of a constant that links the two. Knowledge of the constant along with time-strain measurement at another well enables estimation of strain at the other well.

Figure 1:
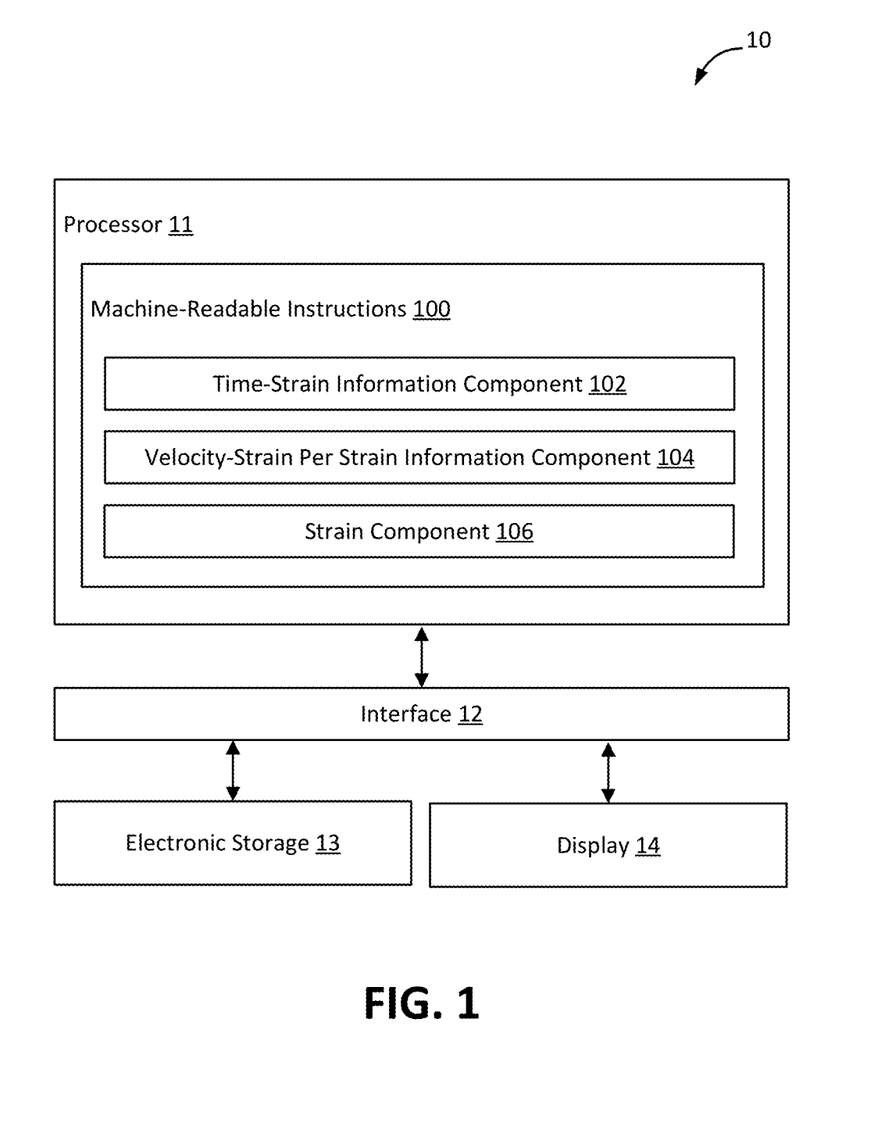
FIG. 1 illustrates an example system for estimating strain along a well.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, a display 14, and/or other components. Time-strain information of a well, velocity-strain per strain information for the well, and/or other information may be obtained by the processor 11. The time-strain information of the well may characterize time-strain of the well as a function of distance along the well. The time-strain of the well may be measured via an interior fiber optic cable within the well. The well may be adjacent to one or more types of rock, such as a first type of rock and/or other types of rock. The velocity-strain per strain information for the well may characterize one or more values of velocity-strain per strain corresponding to the type(s) of rock adjacent to the well. The value(s) of velocity-strain per strain may include a first value of velocity-strain per strain corresponding to the first type of rock adjacent to the well. The first value of velocity-strain per strain may be determined based on fiber optic measurement of time-strain and strain of another well different from the well, and/or other information. The strain of the well as the function of distance along the well may be estimated by the processor 11 based on (1) the time-strain of the well as the function of distance along the well, (2) the value(s) of velocity-strain per strain corresponding to the type(s) of rock adjacent to the well, and/or other information. The strain of the well adjacent to the first type of rock may be estimated based on the time-strain of the well along the first type of rock, the first value of velocity-strain per strain corresponding to the first type of rock, and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to one or more wells, information relating to strain, time-strain information, information relating to time-strain, information relating to velocity-strain, velocity-strain per strain information, information relating to velocity-strain per strain, information relating to one or more types of rock, and/or other information.

The display 14 may refer to an electronic device that provides visual presentation of information. The display 14 may include a color display and/or a non-color display. The display 14 may be configured to visually present information. The display 14 may present information using/within one or more graphical user interfaces. For example, the display 14 may present information relating to strain, time-strain, velocity-strain, velocity-strain per strain, types of rock, mechanical earth models, subsurface strain forecasting, and/or other information. For instance, the display 14 may present estimation of strain along a well using time-strain and values of velocity-strain per strain, and/or subsurface strain forecasted by a mechanical earth model.

Strain may refer to deformation in and/or change in shape of a material, such as rock, cement, casing, tubing, fiber-optic cable, and/or other materials. Strain may be caused due to force/stress being applied to the materials. Examples of strain in rock include folding, faulting, fracturing, tension, and/or compression of rock. Strain may include vertical strain, horizontal strain, and/or other strain. Strain may be defined as a ratio of change in a dimension (e.g., length, volume) to the initial dimension. For example, vertical strain ($\varepsilon_{zz}$) may be defined as a ratio of change in vertical dimension of rock to the initial vertical dimension of rock: $\varepsilon_{zz}=\Delta z/z$, where $\Delta z$ is vertical compaction or dilation relative to the original length z.

Strain in rock may cause the properties of the rock to change (e.g., change in porosity of rock), which may change the velocity of seismic wave traveling through the rock to be changed. For example, compression of rock may result in faster seismic wave velocity through the rock. Where $\varepsilon_{zz}\neq 0$, propagation velocity of seismic wave may change in the rock, resulting in velocity-strain ($\Delta v/v$), a ratio of change in velocity $\Delta v$ to original velocity v. Change in velocity may change seismic wave propagation time through the rock (time it takes for a seismic wave to move through the rock). Additionally, strain may change the thickness of the rock (e.g., rock compaction resulting in thinner rock), further changing the seismic wave propagation time through the rock. That is, strain may decrease the distance that the seismic wave must travel through the rock. These changes may result in time-strain ($\Delta t/t$), a ratio of change in seismic wave propagation time ($\Delta t$) to original seismic wave propagation time (t).

Subsurface strain estimation may refer to estimation of strain beneath the surface of the Earth. Subsurface strain estimation may refer to estimation of strain underground. Subsurface strain estimation may include estimation of subsurface strain in the past (e.g., using measurements from the past), estimation of current subsurface strain (e.g., using current measurements), and/or estimation of subsurface strain in the future (e.g., using a model such as a Mechanical Earth Model (MEM)). Estimation of subsurface strain in the future may be referred to as subsurface strain forecasting (SSSF).

A MEM may represent the mechanical properties of rocks, including elastic moduli, fractures, stresses, temperatures, pressure conditions, and/or other mechanical properties of rock. A MEM may include a numerical representation of the state of stress and rock mechanical properties for a specific stratigraphic section in a field or a basin. A MEM may include a repository of data—measurements and models—representing the mechanical properties of rocks and fractures as well as the stresses, pressures, and temperatures acting on them at depth.

A MEM may be used to understand subsurface configurations and/or changes in subsurface configurations. A MEM may be used for analysis of well operations, such as for oil, gas, and/or CO2 sequestration and fluid injection management including reservoir and overburden. For example, a MEM may be used to understand how rocks change, in response to drilling, completion, and production operations. Data points in an MEM may be referenced to its 3D spatial coordinates and time of sample collection.

MEM calibration and verification may be an imperative part of the SSSF process. A typical MEM calibration process may comprises modifying the model boundary conditions, the regional tectonic displacement field, and/or material properties to best fit observed data. Fiber optic cables may be used to perform direct and/or indirect measurement of strain. Fiber optic measurement of strain may be used for MEM calibration and/or verification.

Measurement and/or estimation of strain along a well may be used for analysis of well and/or well operations. For example, measurement and/or estimation of strain along a well may be used to calibrate and/or verify a MEM. As another example, measurement and/or estimation of strain along a well may be used to determine the integrity of the well. Other uses of strain measurement and estimation are contemplated.

Strain along a well may refer to/include strain of the well. Strain along a well may refer to/include strain in the well. Strain along a well may refer to/include strain in materials/media around the well. Strain along a well may refer to/include strain in materials/media adjacent to the well. For example, strain along a well may refer to strain in rock, cement, and/or other materials around/adjacent to the well. Strain along a well may refer to values of strain at different positions along the well. For example, for a vertical well, strain along a well may refer to values of strain at different depths along the well. Strain along a well may include a vertical component, a lateral component, and/or other directional components.

A well may refer to a hole or a tunnel in the ground. A well may be drilled in one or more directions. For example, a well may include a vertical well, a horizontal well, a deviated well, and/or other type of well. A well may be drilled in the ground for exploration and/or recovery of natural resources in the ground. For example, a well may be drilled in the ground to aid in extraction and/or production of hydrocarbons. As another example, a well may be drilled in the ground for fluid injection. Application of the present disclosure to other types of wells and wells drilled for other purposes are contemplated.

A well may be drilled into a subsurface region using practically any drilling technique and equipment known in the art, such as geosteering, directional drilling, etc. Drilling a wellbore may include using a tool, such as a drilling tool that includes a drill bit and a drill string. Drilling fluid, such as drilling mud, may be used while drilling in order to cool the drill tool and remove cuttings. Other tools may also be used while drilling or after drilling, such as measurement-while-drilling (MWD) tools, seismic-while-drilling (SWD) tools, wireline tools, logging-while-drilling (LWD) tools, and/or other downhole tools. After drilling to a predetermined depth, the drill string and the drill bit may be removed, and then the casing, the tubing, and/or other equipment may be installed according to the design of the well. The equipment to be used in drilling a well may be dependent on the design of the well, the subsurface region, the hydrocarbons, and/or other factors.

A well may include a plurality of components, such as, but not limited to, a casing, a liner, a tubing string, a heating element, a sensor, a packer, a screen, a gravel pack, artificial lift equipment (e.g., an electric submersible pump (ESP)), tubing, and/or other components. If a wellbore is drilled offshore, the wellbore may include one or more of the previous components plus other offshore components, such as a riser. A wellbore may also include equipment to control fluid flow into the wellbore, control fluid flow out of the wellbore, or any combination thereof. For example, a well may include a wellhead, a blowout preventer (BOP), a choke, a valve, and/or other control devices. These control devices may be located on the surface, under the surface (e.g., downhole in the well), or any combination thereof. In some embodiments, same control devices may be used to control fluid flow into and out of a well. In some embodiments, different control devices may be used to control fluid flow into and out of a well. In some embodiments, the rate of flow of fluids through a well may depend on the fluid handling capacities of the surface facility that is in fluidic communication with the well. The equipment to be used in controlling fluid flow into and out of a well may be dependent on the well, the subsurface region, the surface facility, and/or other factors. Moreover, sand control equipment and/or sand monitoring equipment may also be installed (e.g., downhole and/or on the surface). A well may also include any completion hardware that is not discussed separately. The term "well" may be used synonymously with the terms "borehole," "wellbore," or "well bore." The term "well" or "wellbore" is not limited to any description or configuration described herein.

Figure 3:
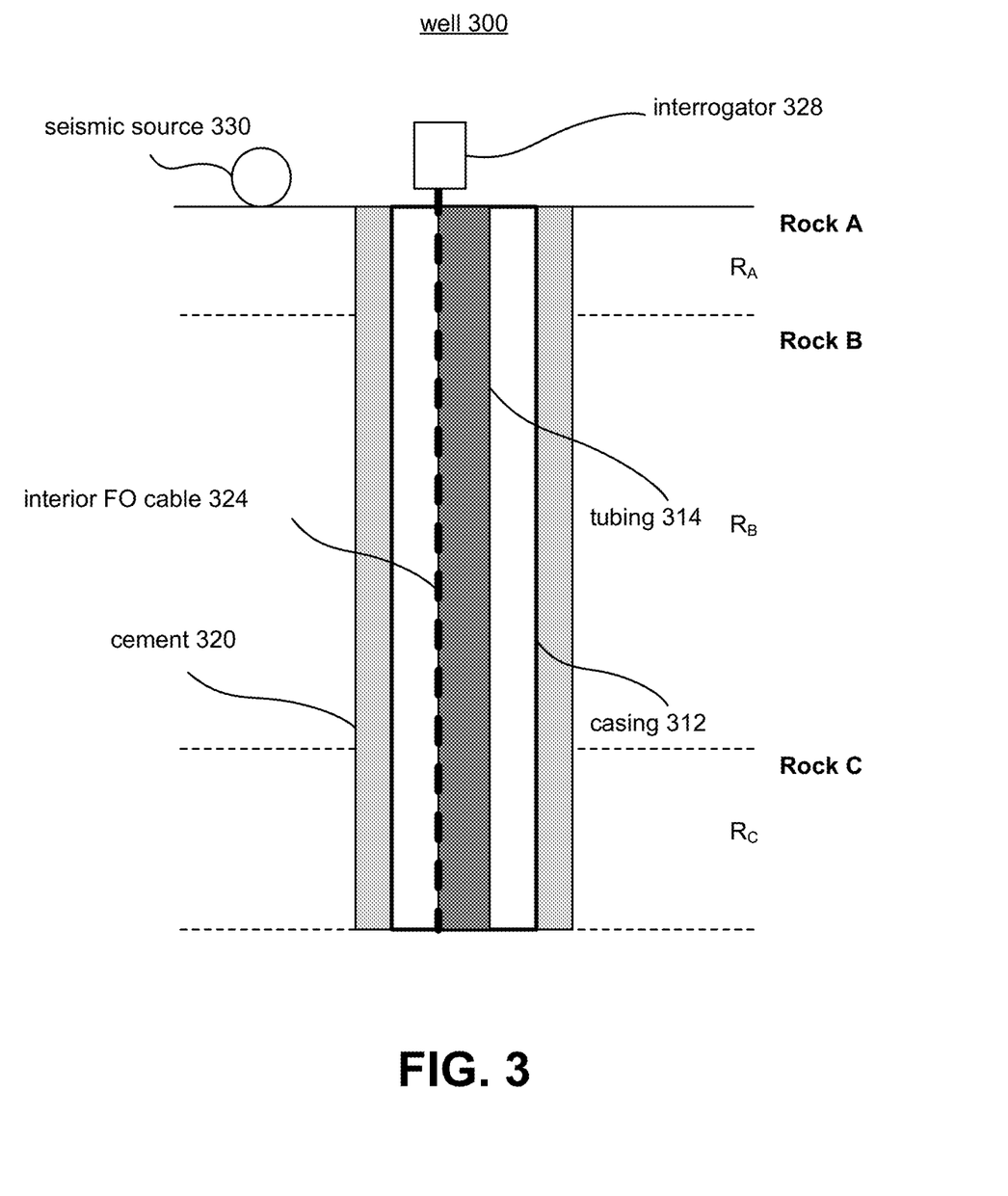
FIG. 3 illustrates an example well in which strain is estimated using values of velocity-strain per strain for rock types.

FIG. 3 illustrates an example well 300. The well 300 may be adjacent to (e.g., surrounded by) different types of rock, such as Rock A, Rock B, and Rock C. The well 300 may include a casing 312, a tubing 314 within the casing 312, and/or other components. The volume between the casing 312 and the adjacent rock may be filled with cement 320. The cement 320 may physically/rigidly couple the casing 312 to the adjacent rock. Use of other materials between the casing 312 and the adjacent rock is contemplated.

A fiber optic cable outside a casing may be referred to as an exterior fiber optic cable. A fiber optic cable within a casing may be referred to as an interior fiber optic cable. The well 300 may not include exterior fiber optic cables that are positioned to directly measure strain along the well 300. For example, no exterior fiber optic cables may exist between the casing 312 and the rock adjacent to the casing 312. No exterior fiber optic cables may be cemented between the casing 312 and the rock adjacent to the casing 312. Thus, the well 300 may not include any exterior fiber optic cables coupled to the rock adjacent to the well 300. In some implementations, the well 300 may be a well in which no exterior fiber optic cables were installed during well completion. For example, the well 300 may be an existing well or a legacy well.

It may be impractical/impossible to install an exterior fiber optic cable to directly measure strain along the well 300. For example, it may be too costly and/or time-consuming to change the well 300 by inserting an exterior fiber optic cable between the well 300 and the rock adjacent to the well. On the other hand, it may be possible to insert one or more interior fiber optic cables within the casing 312. For example, the well 300 may include an interior fiber optic cable 324 within the casing 312. The interior fiber optic cable 324 may run along the length of the well 300. In some implementations, the interior fiber optic cable 324 may be attached to the tubing 314. The interior fiber optic cable 324 may be attached to the tubing 314 from outside, within, or inside the tubing. For example, the interior fiber optic cable 324 may be clamped to the tubing 314 (at one or more locations along the tubing 314) or built into the tubing 314. Other attachment of the interior fiber optic cable 324 to the tubing 314 is contemplated. In some implementations, the interior fiber optic 324 cable may not be attached to the tubing 314. For example, the interior fiber optic cable 324 may hang inside the casing 312 without touching the tubing 314. The interior fiber optic cable 324 may hang inside the tubing 314 without touching the tubing 314.

The interior fiber optic cable 324 may be used to measure time-strain of the well 300. The strain along the well 300 (e.g., the strain in the rock adjacent to the well 300 and/or in the cement 320) may cause seismic wave propagation time to change along the well 300 (e.g., through the rock and/or the cement 320). Seismic wave may be propagated near/within the well 300 using a seismic source 330. A seismic source may refer to a device that generates seismic energy. A seismic source may refer to a device that propagates seismic wave through one or more materials.

The change in seismic wave propagation time (difference in seismic wave propagation times before and after strain) may be measured via the interior fiber optic cable 324 using an interrogator 328. The interior fiber optic cable 324 may change its shape (e.g., move, flex, vibrate, be squeezed) when it is hit by a seismic wave, and the change in the shape of the interior fiber optic cable 324 (e.g., causing change in refractive index properties) may be detected by the interrogator 328.

The interrogator 328 may be an optoelectronic instrument that acquires data using fiber optic cables. The interrogator 328 may include a source of light and a receiver of light. The light transmitted into a fiber optic cable by the interrogator 328 may be received by the interrogator 328. The interrogator 328 may use the characteristic of the received light to generate sensor data, such as how, when, and/or where the shape of the fiber optic cable changed, which may be used to determine when and/or where seismic wave hit the fiber optic cable. This information may be used to determine seismic wave propagation time, change in seismic wave propagation time, and/or time-strain. The interrogator 328 may measure time-strain at different positions along the interior fiber optic cable 324, which results in measurement of time-strain at different positions along the well 300. Thus, the interrogator 328 may measure time-strain of the well 300 as a function of distance along the well 300 (e.g., measure time-strain of the well 300 at different depths). The interior fiber optic cable 324 and the interrogator 328 may be used to perform time-strain monitoring of the well 300. An example fiber optic system that enables time-strain measurement is Distributive Acoustic Sensing. Use of other fiber optic system to measure time-strain is contemplated. In some implementations, measurement of seismic wave propagation time and/or change in seismic wave propagation time may be used to determine seismic wave velocity and/or velocity-strain.

The extent to the measured seismic wave propagation time, the measured change in seismic wave propagation time, and/or the measured time-strain is indicative of strain of the well 300 may depend on the proximity of the seismic source 330 to the well 300. If the seismic source 330 is laterally close to the well 300, then the seismic wave propagated by the seismic source 330 may travel over small lateral distance before hitting/being measured by the interior fiber optic cable 324, and the measured seismic wave propagation time, the measured change in seismic wave propagation time, and/or the measured time-strain may be indicative of strain of materials within a small lateral area adjacent to the well 300 (e.g., small aperture around the well 300, small lateral area between the seismic source 330 and the well 300, small area/volume over which the seismic wave traveled before hitting/being measured by the interior fiber optic cable 324). If the seismic source 330 is laterally farther from the well 300, then the seismic wave propagated by the seismic source 330 may travel over large lateral distance before hitting/being measured by the interior fiber optic cable 324, and the measured seismic wave propagation time, the measured change in seismic wave propagation time, and/or the measured time-strain may be indicative of strain of materials within a large lateral area adjacent to the well 300 (e.g., large aperture around the well 300, large lateral area between the seismic source 330 and the well 300, large area/volume over which the seismic wave traveled before hitting/being measured by the interior fiber optic cable 324).

Figure 4:
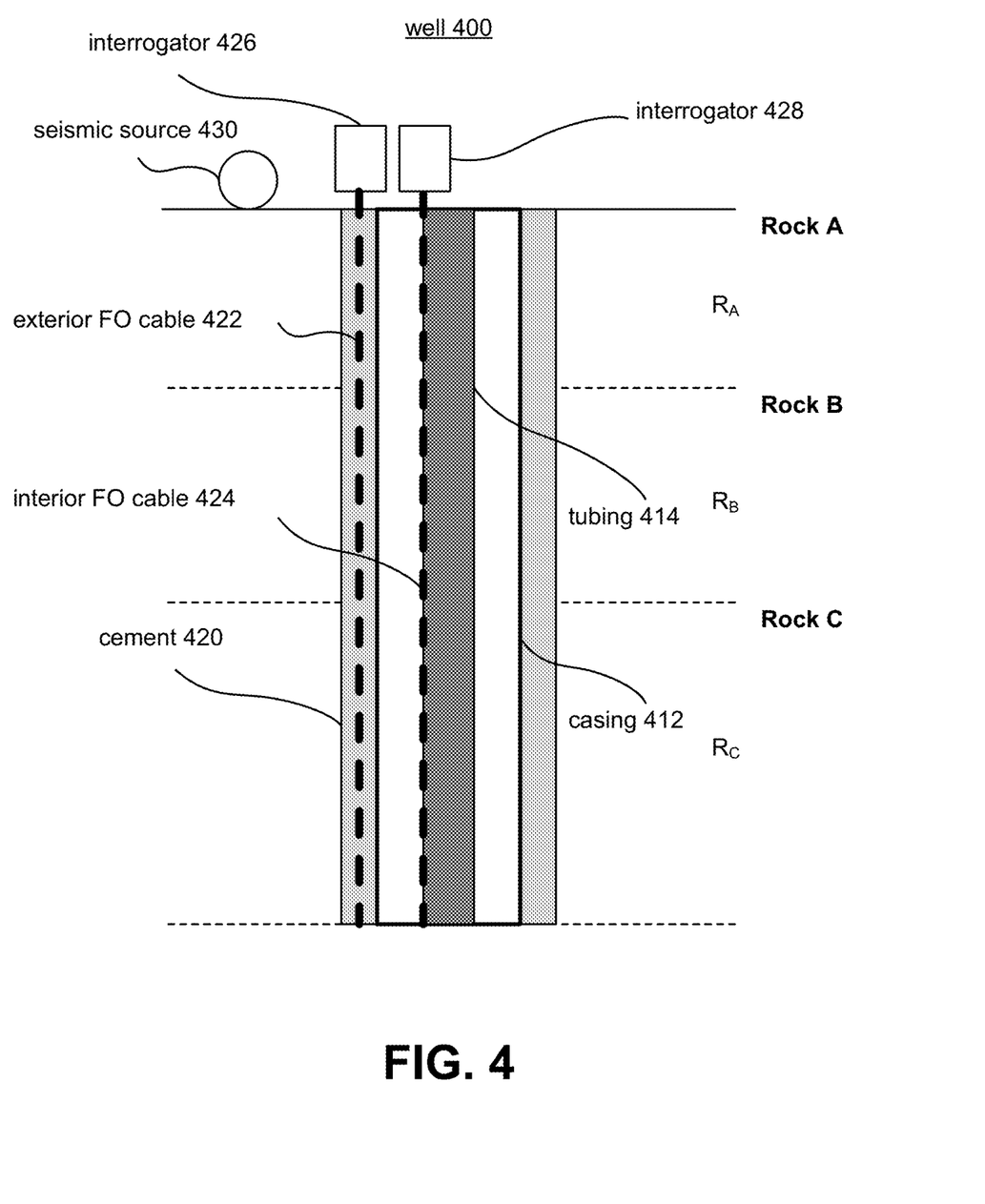
FIG. 4 illustrates an example well from which values of velocity-strain per strain for rock types are determined.

If the interior fiber optic cable 324 is attached to the tubing 314, the characteristics of the light received by the interrogator 328 may be used to measure strain of the tubing 314. That is, the strain of the tubing 314 may be directly measured via the interior fiber optic cable 324. The strain of the tubing 314 may be compared to the strain of the well 300 estimated using the time-strain of the well 300 to determine whether the strain of the tubing 314 may be used as a substitute for the strain of the well 300. The strain of the tubing 314 may be compared to the strain of the well 300 estimated using the time-strain of the well 300 to determine whether they are or are not consistent with each other. An example fiber optic system that enables strain measurement is Distributive Strain Sensing and/or Direct Strain Sensing. Use of other fiber optic system to measure strain is contemplated. I FIG. 4 illustrates an example well 400. The well 400 may be adjacent to (e.g., surrounded by) different types of rock, such as Rock A, Rock B, and Rock C. The well 400 may include a casing 412, a tubing 414 within the casing 412, and/or other components. The volume between the casing 412 and the adjacent rock may be filled with cement 420. The cement 420 may physically/rigidly couple the casing 412 to the adjacent rock. Use of other materials between the casing 412 and the adjacent rock is contemplated.

The well 400 may include one or more exterior fiber optic cables that are positioned to directly measure strain along the well 400. For example, an exterior fiber optic cable 422 may exist between the casing 412 and the rock adjacent to the casing 412. The exterior fiber optic cable 422 may be cemented between the casing 412 and the rock adjacent to the casing 412. Thus, the well 400 may include the exterior fiber optic cable 422 coupled to the rock adjacent to the well 400. In some implementations, the well 400 may be a well in which exterior fiber optic cable(s) were installed during well completion. For example, the well 400 may be a new well.

The exterior fiber optic cable 422 may be used to directly measure strain along the well 400. Coupling between the exterior fiber optic cable 422 and the rock adjacent to the well 400 may cause strain in the rock adjacent to well 400 to appear in the exterior fiber optic cable 422. Strain in the rock adjacent to the well 400 may cause strain in the cement 420, which may cause strain in the exterior fiber optic cable 422. Thus, measurement of strain along the exterior fiber optic cable 422 may be used as measurement of strain along the well 400. The strain along the exterior fiber optic cable 422 may be measured by an interrogator 426 without a seismic source as the change in shape of the exterior fiber optic cable 422 is caused by the strain in the cement 420. The interrogator 426 may measure strain at different positions along the exterior fiber optic cable 422, which results in measurement of strain at different positions along the well 400. Thus, the interrogator 426 may measure strain of the well 400 as a function of distance along the well 400 (e.g., measure strain of the well 400 at different depths). The exterior fiber optic cable 422 and the interrogator 426 may be used to perform strain monitoring of the well 400.

In some implementations, the exterior fiber optic cable 422 may be used to measure time-strain of the well 400. The strain in the rock adjacent to the well 400 and/or in the cement 420 may cause seismic wave propagation time to change through the rock and/or the cement 420. Seismic wave may be propagated near/within the well 400 using a seismic source 430. The change in seismic wave propagation time (difference in seismic wave propagation times) may be measured via the exterior fiber optic cable 422 using the interrogator 426. The exterior fiber optic cable 422 may change its shape (e.g., move, flex, vibrate, be squeezed) when it is hit by a seismic wave, and the change in the shape of the exterior fiber optic cable 422 may be detected by the interrogator 426.

The interrogator 426 may measure time-strain at different positions along the exterior fiber optic cable 422, which results in measurement of time-strain at different positions along the well 400. Thus, the interrogator 426 may measure time-strain of the well 400 as a function of distance along the well 400 (e.g., measure time-strain of the well 400 at different depths). The exterior fiber optic cable 422 and the interrogator 426 may be used to perform time-strain monitoring of the well 400. In some implementations, measurement of seismic wave propagation time and/or change in seismic wave propagation time may be used to determine seismic wave velocity and/or velocity-strain.

In some implementations, the well 400 may include one or more interior fiber optic cables within the casing 412. For example, the well 400 may include an interior fiber optic cable 424 within the casing 412. The interior fiber optic cable 424 may run along the length of the well 400. In some implementations, the interior fiber optic cable 424 may be attached to the tubing 414. For example, the interior fiber optic cable 424 may be clamped to the tubing 414 or built into the tubing 414. Other attachment of the interior fiber optic cable 424 to the tubing 414 is contemplated. In some implementations, the interior fiber optic cable 424 may not be attached to the tubing 414. For example, the interior fiber optic cable 424 may hang inside the casing 412 without touching the tubing 414.

The interior fiber optic cable 424 may be used to measure time-strain of the well 400. The strain in the rock adjacent to the well 400 and/or in the cement 420 may cause seismic wave propagation time to change through the rock and/or the cement 420. Seismic wave may be propagated near/within the well 400 using the seismic source 430. The change in seismic wave propagation time (difference in seismic wave propagation times) may be measured via the interior fiber optic cable 424 using the interrogator 428. The interior fiber optic cable 424 may change its shape (e.g., move, flex, vibrate, be squeezed) when it is hit by a seismic wave, and the change in the shape of the interior fiber optic cable 424 may be detected by the interrogator 428.

The interrogator 428 may measure time-strain at different positions along the interior fiber optic cable 424, which results in measurement of time-strain at different positions along the well 400. Thus, the interrogator 428 may measure time-strain of the well 400 as a function of distance along the well 400 (e.g., measure time-strain of the well 400 at different depths). The interior fiber optic cable 424 and the interrogator 428 may be used to perform time-strain monitoring of the well 400. In some implementations, measurement of seismic wave propagation time and/or change in seismic wave propagation time may be used to determine seismic wave velocity and/or velocity-strain.

In some implementations, time-strain of the well 400 may be measured via both the exterior fiber optic cable 422 and the interior fiber optic cable 424. These measurements may be compared to determine whether they are or are not consistent with each other. The measurements may be compared to determine whether one or more time-strain measurements should be adjusted when being used for strain estimation. For example, there may be differences between time-strain measured by the exterior fiber optic cable 422 and the interior fiber optic cable 424. Time-strain measured via the exterior fiber optic cable 422 may provide more accurate estimation of strain along the well 400 than time-strain measured via the interior fiber optic cable 424. Differences between time-strain measured via the exterior fiber optic cable 422 and the interior fiber optic cable 424 may be used to adjust the time-strain measured via the interior fiber optic cable 424, and the adjusted time-strain measurement may be used to estimate strain along the well 400 more accurately.

If the interior fiber optic cable 424 is attached to the tubing 414, the interior fiber optic cable 424 may be used by the interrogator 428 to measure strain of the tubing 414. That is, the strain of the tubing 414 may be directly measured via the interior fiber optic cable 424. The strain of the tubing 414 may be compared to the strain of the well 400 measured via the exterior fiber optic cable 422 to determine whether the strain of the tubing 414 may be used as a substitute for the strain of the well 400. The strain of the tubing 414 measured via the interior fiber optic cable 424 may be compared to the strain of the well 400 measured via the exterior fiber optic cable 422 to determine whether they are or are not consistent with each other.

In some implementations, one or more fiber optic strain sensors may be positioned along one or more fiber optic cables. For example, one or more fiber optic strain sensors may be positioned at one or more locations along the exterior fiber optic cable 422. A fiber optic strain sensor may include one or more fiber optic cables wrapped around in a helical manner (e.g., in a spiral). The fiber optic strain sensor(s) may be configured to measure helical strain at corresponding location(s) along the fiber optic cable(s). Helical strain may include lateral/side-way strain. The fiber optic strain sensor(s) may be configured to measure strains in three component directions (e.g., x, y, z).

Measurement of strain and time-strain (and/or velocity-strain) of a well may enable determination of value(s) of velocity-strain per strain corresponding to type(s) of rock adjacent to well. That is, fiber optic measurement of strain and time-strain of a well may be used to calculate values of velocity-strain per strain corresponding to type(s) of rock adjacent to well. Values of velocity-strain per strain may vary over rock type. Velocity-strain per strain may be referred to as R-factor (R). R-factor is described in Hatchell, P. & Bourne, S., "Rocks under strain: Strain-induced time-lapse time shifts are observed for depleting reservoirs," The Leading Edge, 24, 1222-1225 (2005). A value of velocity-strain per strain corresponding to a type of rock may be a constant that links strain and time-strain for the type of rock. Knowledge of the value of velocity-strain per strain corresponding to a type of rock may enable strain estimation at a well adjacent to the same type of rock based on time-strain measurement at the well.

Values of velocity-strain per strain (R) may be equal to a negative ratio of velocity-strain ($\Delta v/v$) to strain ($\varepsilon$): $R=-(\Delta v/v)/\varepsilon$. Velocity-strain ($\Delta v/v$) may be defined in terms of velocity-strain per strain (R) as negative of velocity-strain per strain (R) multiplied by strain ($\varepsilon$): $\Delta v/v=-R\varepsilon$. Time-strain ($\Delta t/t$) may be defined in terms of velocity-strain per strain (R) as one plus velocity-strain per strain (R), multiplied by strain ($\varepsilon$): $\Delta t/t=(1+R)\varepsilon$.

Thus, knowledge of two of strain, time-strain, and velocity-strain per strain enables determination (e.g., calculation, estimation) of the third. For example, knowledge of strain and time-strain for a rock type enables determination of the value of velocity-strain per strain corresponding to the rock type. Knowledge of time-strain and value of velocity-strain per strain for a rock type enables determination of strain in the rock type. Similarly, knowledge of two of strain, velocity-strain, and velocity-strain per strain enables determination of the third. For example, knowledge of strain and velocity-strain for a rock type enables determination of the value of velocity-strain per strain corresponding to the rock type. Knowledge of velocity-strain and value of velocity-strain per strain for a rock type enables determination of strain in the rock type. Values of velocity-strain per strain determined for rock types adjacent to a well may be used to determine strain at another well using time-strain measurements at the other well.

For example, referring to FIG. 4, fiber optic measurement of strain ($\varepsilon$) of the well 400 along Rock A (via the exterior fiber optic cable 422) and fiber optic measurement of time-strain ($\Delta t/t$) of the well 400 along Rock A (via the exterior fiber optic cable 422 and/or the interior fiber optic cable 424) may be used to determine value of velocity-strain per strain ($R_A$) corresponding to Rock A. Fiber optic measurement of strain ($\varepsilon$) of the well 400 along Rock B and fiber optic measurement of time-strain ($\Delta t/t$) of the well 400 along Rock B may be used to determine value of velocity-strain per strain ($R_B$) corresponding to Rock B. Fiber optic measurement of strain ($\varepsilon$) of the well 400 along Rock C and fiber optic measurement of time-strain ($\Delta t/t$) of the well 400 along Rock C may be used to determine value of velocity-strain per strain ($R_C$) corresponding to Rock C. Thus, fiber optic measurement of strain and time-strain of the well 400 may be used to determine values of velocity-strain per strain corresponding to types of rock adjacent to the well 400. A well from which values of velocity-strain per strain for rock types are determined, such as the well 400, may be referred to as an R-factor calibration well/strain calibration well/calibration well.

One or more of the values of velocity-strain per strain determined from a R-factor calibration well may be used in one or more other wells to estimate strain at the other well(s). The value(s) of velocity-strain per strain may be used in combination with fiber optic measurement of time-strain (and/or velocity-strain) at the other well(s) to estimate strain of the other well(s). Values of velocity-strain per strain for rock types may enable fiber optic measurement of time-strain (and/or velocity-strain) of a well to be used to back-calculate strain of the well. Values of velocity-strain per strain may be used to perform strain estimation for well in which direct fiber optic measurement of strain is not possible. The values of velocity-strain per strain from R-factor calibration wells may be combined with fiber optic measurement of time-strain (and/or velocity-strain) to enable strain estimation in wells that have same/similar types of rock as the R-factor calibration wells.

For example, referring to FIG. 3, direct fiber optic measurement of strain along the well 300 may not be possible due to lack of exterior fiber optic cable between the casing 312 and the rock adjacent to the well 300. However, the types of rock adjacent to the well 300 may be the same types of rock adjacent to the well 400. Values of velocity-strain per strain ($R_A$, $R_B$, $R_C$) determined using fiber optic measurement of strain and time-strain of the well 400 may be used to estimate strain along the well 300. For example, strain of the well 300 adjacent to Rock A may be estimated based on time-strain of the well 300 along Rock A (measured via the interior fiber optic cable 324) and the value of velocity-strain per strain ($R_A$) corresponding to Rock A. Strain of the well 300 adjacent to Rock B may be estimated based on time-strain of the well 300 along Rock B and the value of velocity-strain per strain ($R_B$) corresponding to Rock B. Strain of the well 300 adjacent to Rock C may be estimated based on time-strain of the well 300 along Rock C and the value of velocity-strain per strain ($R_C$) corresponding to Rock C. A well in which strain is estimated using time-strain measurement (and/or velocity-strain measurement) and values of velocity-strain per strain, such as the well 300, may be referred to as a strain-estimation well. A strain-estimation well may be linked to one or more R-factor calibration wells based on types of rock adjacent to the wells/corresponding values of velocity-strain per strain.

Values of velocity-strain per strain for a strain-estimation well may be determined from one or more R-factor calibration wells. For example, a strain-estimation well may be adjacent to three types of rock, such as the well 300. An R-factor calibration well may be adjacent to the same three types of rock, such as the well 400. Values of velocity-strain per strain for the well 300 may be determined from the well 400. As another example, values of velocity-strain per strain for the well may be determined from multiple R-factor calibration wells. For instance, a value of velocity-strain per strain for one type of rock may be determine from one R-factor calibration well (adjacent to the same one type of rock) while values of velocity-strain per strain for the other two types of rock may be determined from another R-factor calibration well (adjacent to the same two types of rock). Alternative, a value of velocity-strain per strain for individual types of rock may be determine from different R-factor calibration wells.

In some implementations, a value of velocity-strain per strain for a particular type of rock may be determined from multiple R-factor calibration wells. For example, separate values of velocity-strain per strain for a particular type of rock may be determined from multiple R-factor calibration wells (each adjacent to the same type of rock), and the separate values may be combined (e.g., averaged) for use in strain estimation at a strain-estimation well. As another example, none of the R-factor calibration wells may be adjacent to the same type of rock as the rock adjacent to the strain-estimation well. Values of velocity-strain per strain for different types of rock from the multiple R-factor calibration wells may be combined to estimate the value of velocity-strain per strain for the rock adjacent to the strain-estimation well. That is, the value of velocity-strain per strain for the rock adjacent to the strain-estimation well may be estimated by combining values of velocity-strain corresponding to different types of rock. For instance, averaged properties of two different types of rock may match the properties of the rock adjacent to the strain-estimation well.

The values of velocity-strain per strain for the two different types of rock may be combined to estimate the value of velocity-strain per strain for the rock adjacent to the strain-estimation well. Other combination of velocity-strain per strain is contemplated.

Placement and number of components shown in FIGS. 3 and 4 are merely provided as examples and are not meant to be limiting. The present disclosure may be applied to wells with different components and/or different component placement. For example, while the seismic sources 330, 430 are shown in FIGS. 3 and 4 as being located at the surface, a seismic source may be located partially or totally under the surface. For example, a seismic source may be located downhole, within, or below a well. For instance, a well may include an open-well and a seismic source may be located below the open well.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate estimating strain along a well. The machine-readable instructions 100 may include one or more computer program components. The machine-readable instructions 100 may include a time-strain information component 102, a velocity-strain per strain information component 104, a strain component 106, and/or other computer program components.

The time-strain information component 102 may be configured to obtain time-strain information of a well and/or other information. The well for which time-strain information is obtained may include a well at which strain is to be estimated using time-strain measurement (and/or velocity-strain measurement) and value(s) of velocity-strain per strain. The well for which time-strain information is obtained may include a strain-estimation well, such as an existing well or a legacy well. The well may be adjacent to one or more types of rock. For example, referring to FIG. 3, the types of rock adjacent to the well may include Rock A, Rock B, Rock, C, and/or other types of rock.

Obtaining time-strain information may include one or more of accessing, acquiring, analyzing, determining, examining, identifying, loading, locating, opening, receiving, retrieving, reviewing, selecting, storing, and/or otherwise obtaining the time-strain information. The time-strain information component 102 may obtain time-strain information from one or more locations. For example, the time-strain information component 102 may obtain time-strain information from a storage location, such as the electronic storage 13, electronic storage of a device accessible via a network, and/or other locations. The time-strain information component 102 may obtain time-strain information from one or more hardware components (e.g., a computing device) and/or one or more software components (e.g., software running on a computing device).

The time-strain information may characterize time-strain of the well as a function of distance along the well. For example, for a vertical well, the time-strain information may characterize time-strain of the well at different depths along the well. The time-strain information may characterize time-strain of the well over the entire length of the well (e.g., from top to bottom) or for one or more portions of the well.

The time-strain information may characterize the time-strain of the well by describing, defining, and/or otherwise characterizing the time-strain of the well. The time-strain information may characterize the time-strain of the well by including information that describes, delineates, defines, identifies, is associated with, quantifies, reflects, sets forth, and/or otherwise characterizes one or more of value, property, quality, quantity, attribute, feature, and/or other aspects of the time-strain of the well. For example, the time-strain information may characterize the time-strain of the well by including information that specifies values of time-strain at different locations along the well and/or information that may be used to determine the values of time-strain at different locations along the well. Other types of time-strain information are contemplated.

The time-strain of the well (characterized by the time-strain information) may be measured via one or more interior fiber optic cables within the well. For example, referring to FIG. 3, the time-strain of the well 300 may be measured via the interior fiber optic cable 324. Other measurements of time-strain of the well are contemplated.

In some implementations, interior fiber optic cable(s) of the well may be positioned within a casing of the well. For example, referring to FIG. 3, the interior fiber optic cable 324 may be positioned within the casing 312 of the well 300. In some implementations, the interior fiber optic cable(s) may be clamped to a tubing of the well. For example, referring to FIG. 3, the interior fiber optic cable 324 may be clamped to the tubing 314 of the well 300. In some implementations, the interior fiber optic cable(s) may be located within the tubing of the well. For example, the interior fiber optic cable(s) may be built into the tubing 314. In some implementations, the well may not include an exterior fiber optic cable coupled to the rock adjacent to the well. For example, referring to FIG. 3, no exterior fiber optic cable may be located between the casing 312 and the rock adjacent to the well 300 (e.g., no exterior fiber optic cable cemented between the casing 312 and the rock adjacent to the well 300). Direct fiber optic measurement of strain along the well 300 may not be possible due to the lack of an exterior fiber optic cable.

The velocity-strain per strain information component 104 may be configured to obtain velocity-strain per strain information for the well, and/or other information. The well for which velocity-strain per strain information is obtained may include a well at which strain is to be estimated using time-strain measurement (and/or velocity-strain measurement) and value(s) of velocity-strain per strain. The well for which velocity-strain information is obtained may include a strain-estimation well, such as an existing well or a legacy well.

Obtaining velocity-strain per strain information may include one or more of accessing, acquiring, analyzing, determining, examining, identifying, loading, locating, opening, receiving, retrieving, reviewing, selecting, storing, and/or otherwise obtaining the velocity-strain per strain information. The velocity-strain per strain information component 104 may obtain velocity-strain per strain information from one or more locations. For example, the velocity-strain per strain information component 104 may obtain velocity-strain per strain information from a storage location, such as the electronic storage 13, electronic storage of a device accessible via a network, and/or other locations. The velocity-strain per strain information component 104 may obtain velocity-strain per strain information from one or more hardware components (e.g., a computing device) and/or one or more software components (e.g., software running on a computing device).

The velocity-strain per strain information may characterize one or more values of velocity-strain per strain corresponding to the type(s) of rock adjacent to the well. The velocity-strain per strain information may characterize value(s) of velocity-strain per strain corresponding to different types of rock adjacent to the well. For example, referring to FIG. 3, the value(s) of the velocity-strain per strain may include the value of velocity-strain per strain ($R_A$) corresponding to Rock A, the value of velocity-strain per strain ($R_B$) corresponding to Rock B, and the value of velocity-strain per strain ($R_C$) corresponding to Rock C.

The velocity-strain per strain information may characterize the value(s) of velocity-strain per strain corresponding to rock type(s) by describing, defining, and/or otherwise characterizing the value(s) of velocity-strain per strain corresponding to the rock type(s). The velocity-strain per strain information may characterize the value(s) of velocity-strain per strain corresponding to rock type(s) by including information that describes, delineates, defines, identifies, is associated with, quantifies, reflects, sets forth, and/or otherwise characterizes one or more of value, property, quality, quantity, attribute, feature, and/or other aspects of the value(s) of velocity-strain per strain corresponding to the rock type(s). For example, the velocity-strain per strain information may characterize the value(s) of velocity-strain per strain corresponding to rock type(s) by including information that specifies values of velocity-strain per strain corresponding to different rock types and/or information that may be used to determine the values of velocity-strain per strain corresponding to different rock types. Other types of velocity-strain per strain information are contemplated.

The value(s) of velocity-strain per strain (characterized by the velocity-strain per strain information) may be determined based on fiber optic measurement of time-strain and strain of one or more other wells different from the well. The value(s) of velocity-strain per strain may be determined based on fiber optic measurement of time-strain and strain of one or more R-factor calibration wells, such as a well in which one or more exterior fiber optic cable are cemented between the rock and the well during well completion. For example, values of velocity-strain per strain $R_A$, $R_B$, and $R_C$ may be determined based on fiber optic measurement of time-strain and strain of the well 400 shown in FIG. 4.

In some implementations, one or more exterior fiber optic cables may be positioned outside a casing of the other well(s) (R-factor calibration well(s)). For example, referring to FIG. 4, the exterior fiber optic cable 422 may be positioned outside the casing 412 of the well 400. The exterior fiber optic cable(s) may be coupled to the rock of one or more types adjacent to the other well. For example, referring to FIG. 4, the exterior fiber optic cable 422 may be coupled to Rock A, Rock B, and Rock C. The strain of the other well may be measured via the exterior fiber optic cable(s). For example, referring to FIG. 4, strain of the well 400 may be measured via the exterior fiber optic cable 422.

In some implementations, the exterior fiber optic cable(s) may be coupled to the rock of one or more types adjacent to the other well via cementing of the exterior fiber optic cable(s) between the casing of the other well and the rock of one or more types adjacent to the other well. For example, referring to FIG. 4, the exterior fiber optic cable 422 may be coupled to Rock A, Rock B, and Rock C via cementing of the exterior fiber optic cable 422 between the casing 412 of the well 400 and the rock adjacent to the well 400. Cementing may result in physical/rigid coupling between the exterior fiber optic cable 422 and the Rock A, Rock B, and Rock C. Use of other technique/materials to create coupling between the exterior fiber optic cable(s) and the rock adjacent to the other well are contemplated.

In some implementations, the time-strain of the other well may be measured via the exterior fiber optic cable(s) of the other well. For example, referring to FIG. 4, the time-strain of the well 400 may be measured via the exterior fiber optic cable 422. In some implementations, the time-strain of the other well may be measured via one or more interior fiber optic cables within the other well. For example, referring to FIG. 4, the time-strain of the well 400 may be measured via the interior fiber optic cable 424.

The strain component 106 may be configured to estimate strain of the well (strain-estimation well). Strain of the well may refer/include to strain along the well. Strain of the well may refer to strain in the well. Strain of the well may refer to/include strain in materials/media around the well. Strain of the well may refer to/include strain in materials/media adjacent to the well. Estimating strain of a well may include ascertaining, approximating, calculating, determining, establishing, finding, identifying, obtaining, quantifying, and/or otherwise estimating the strain of the well. The strain of the well may be estimated as the function of distance along the well. For example, for a vertical well, the strain of the well may be estimated for different depths along the well.

The strain of the well may be estimated based on (1) the time-strain of the well as the function of distance along the well, (2) the value(s) of velocity-strain per strain corresponding to the type(s) of rock adjacent to the well, and/or other information. For example, for a vertical well, strain of the well may be estimated for different depths along the well based on (1) time-strain of the well at different depths along the well, and (2) the values of velocity-strain per strain corresponding to type(s) of rock adjacent to the well at different depths along the well. The strain of the well adjacent to a particular type of rock may be estimated based on the time-strain of the well along the particular type of rock, the value of velocity-strain per strain corresponding to the particular type of rock, and/or other information.

For example, referring to FIG. 3, the strain of the well 300 at different depths along Rock A may be estimated based on (1) the time-strain of the well 300 at different depths along Rock A (measured via the interior fiber optic cable 324) and (2) the value of velocity-strain per strain ($R_A$) corresponding to Rock A. The strain of the well 300 at different depths along Rock B may be estimated based on (1) the time-strain of the well 300 at different depths along Rock B (measured via the interior fiber optic cable 324) and (2) the value of velocity-strain per strain ($R_B$) corresponding to Rock B. The strain of the well 300 at different depths along Rock C may be estimated based on (1) the time-strain of the well 300 at different depths along Rock C (measured via the interior fiber optic cable 324) and (2) the value of velocity-strain per strain ($R_C$) corresponding to Rock C. In some implementations, estimation of the strain of the well using time-strain measurement may include estimation of the strain of the well using velocity-strain measurement. Thus, fiber optic measurements from within the well may be used to estimate strain of materials/media outside the well, enabling strain monitoring in wells that do not have exterior fiber optic cables to directly measure strain outside the well.

In some implementations, one or more mechanical earth models may be calibrated and/or verified for subsurface strain forecasting based on the strain of the well, and/or other information. Strain estimated using the time-strain of the well and the value(s) of velocity-strain per strain may be used to calibrate and/or verify the MEM(s). The MEM(s) may predict (forecast) values of strain of the well in the future (e.g., values of strain at different locations around the well at different times). The MEM(s) may predict (forecast) changes in strain of the well at different locations and/or at different times.

Calibration of a MEM may refer to setting up the MEM for subsurface strain forecasting. Calibration of a MEM using strain estimation may include setting and/or adjusting parameters of the MEM using strain values that were estimated using the time-strain of the well and the value(s) of velocity-strain per strain. For example, beginning conditions for the MEM may be set for subsurface strain forecasting using the strain of a well estimated for a particular time point/time period.

Verification of a MEM using strain estimation may include checking whether the strain predicted/forecasted by the MEM matches the strain estimated using the time-strain of the well and the value(s) of velocity-strain per strain. For example, the MEM may be used to predict/forecast strain of the well at a future time point/time period. Time-strain of the well and the value(s) of velocity-strain per strain at the future time point/time period may be used to estimate the strain of the well, and the estimated strain may be compared with the strain output by the MEM to determine whether or not the two values match. The parameters of the MEM may be adjusted based on differences between (1) the forecasted strain output by/determined from the MEM and (2) the strain estimated using the time-strain of the well and the value(s) of velocity-strain per strain.

In some implementations, the MEM(s) may be calibrated and/or verified using direct fiber optic measurement of strain of the well (e.g., such as the strain of the well 400 measured via the exterior fiber optic cable 422). That is, if a well has one or more exterior fiber optic cables, the direct strain measurement via the exterior fiber optic cable(s) may be used to calibrate and/or verify the MEM(s).

Strain estimation/measurement via fiber optic cable may provide enhanced subsurface strain sampling, such as more accurate subsurface strain sampling and/or more frequent subsurface strain sampling. Strain estimation/measurement via fiber optic cable may be used to increase the reliability/accuracy of the MEM in subsurface strain forecasting. In some implementations, the time-strain and/or strain of the well may be periodically/continuously monitored to provide periodic/continuous MEM updating. For example, the estimated and/or measured strain of the well may be used to adjust parameters of the MEM periodically/continuously and/or to verify the output of the MEM periodically/continuously.

In some implementations, strain estimation/measurement via fiber optic cable may be used to analyze one or more operations of the well. For example, strain estimation/measurement via fiber optic cable may be used to monitor, determine, and/or adjust well operation parameters. In some implementations, strain estimation/measurement via fiber optic cable may be used to analyze one or more conditions of the well. For example, strain estimation/measurement via fiber optic cable may be used to monitor or determine the integrity of the well. Periodic/continuous strain estimation/measurement via fiber optic cable may be used to provide periodic/continuous well integrity monitoring. Other uses of strain estimation/measurement via fiber optic cable are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). A machine-readable medium may include non-transitory computer-readable medium. For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11, the electronic storage 13, and the display 14 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
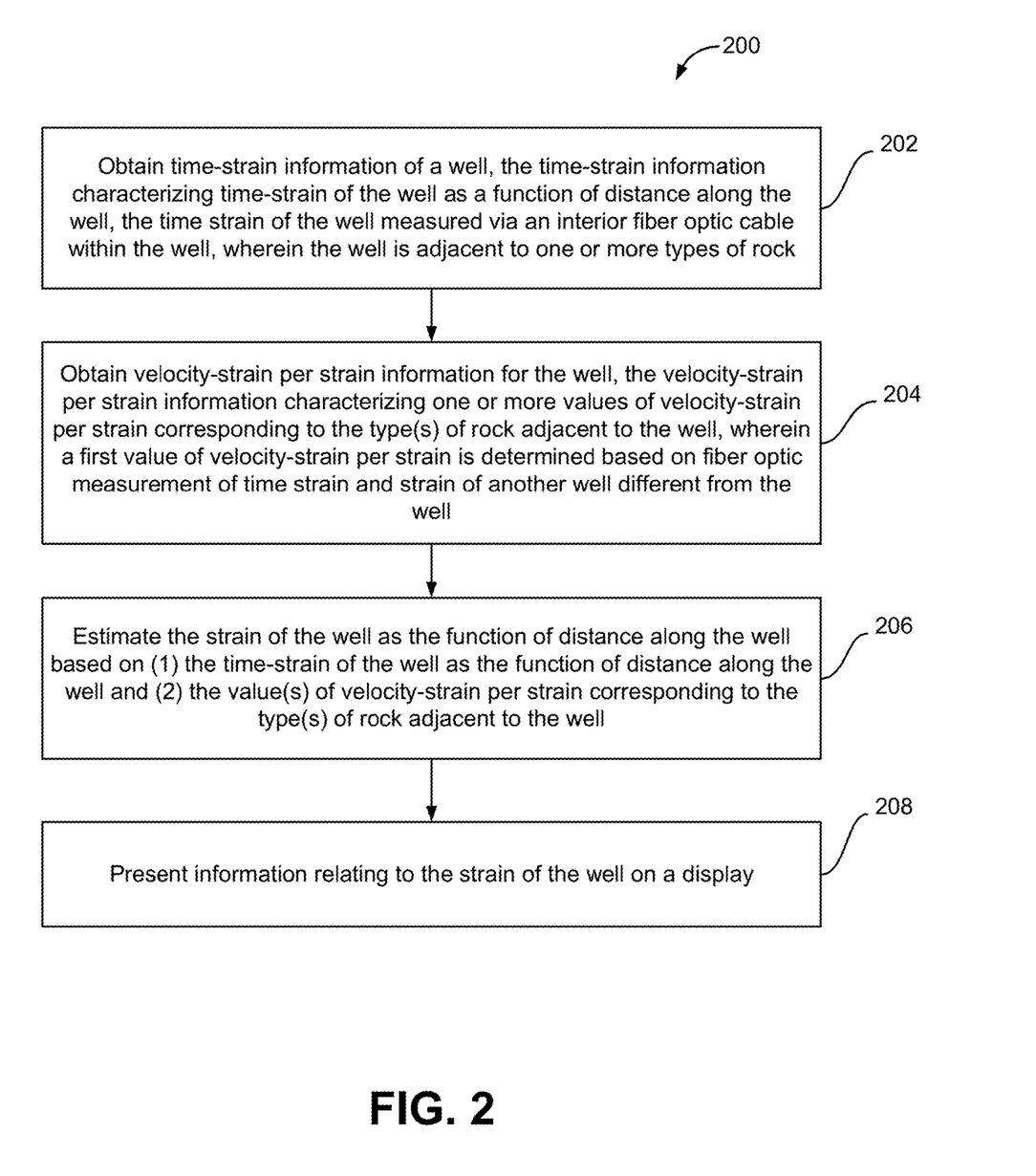
FIG. 2 illustrates an example method for estimating strain along a well.

FIG. 2 illustrates method 200 for estimating strain along a well. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, time-strain information of a well may be obtained. The time-strain information of the well may characterize time-strain of the well as a function of distance along the well. The time-strain of the well may be measured via an interior fiber optic cable within the well. The well may be adjacent to one or more types of rock, such as a first type of rock and/or other types of rock. In some implementation, operation 202 may be performed by a processor component the same as or similar to the time-strain information component 102 (Shown in FIG. 1 and described herein).

At operation 204, velocity-strain per strain information for the well may be obtained. The velocity-strain per strain information for the well may characterize one or more values of velocity-strain per strain corresponding to the type(s) of rock adjacent to the well. The value(s) of velocity-strain per strain may include a first value of velocity-strain per strain corresponding to the first type of rock adjacent to the well. The first value of velocity-strain per strain may be determined based on fiber optic measurement of time-strain and strain of another well different from the well, and/or other information. In some implementation, operation 204 may be performed by a processor component the same as or similar to the velocity-strain per strain information component 104 (Shown in FIG. 1 and described herein).

At operation 206, the strain of the well as the function of distance along the well may be estimated based on (1) the time-strain of the well as the function of distance along the well, (2) the value(s) of velocity-strain per strain corresponding to the type(s) of rock adjacent to the well, and/or other information. The strain of the well adjacent to the first type of rock may be estimated based on the time-strain of the well along the first type of rock, the first value of velocity-strain per strain corresponding to the first type of rock, and/or other information. In some implementation, operation 206 may be performed by a processor component the same as or similar to the strain component 106 (Shown in FIG. 1 and described herein).

At operation 208, information relating to the strain of the well may be presented on a display. The information relating to the strain of the well may include the strain itself (e.g., visual representation of the strain) and/or information determined based on the strain. For example, information relating to the strain of the well may include subsurface strain forecasting by a mechanical earth model using the strain of the well. For instance, the strain of the well may be used to calibrate and/or verify the mechanical earth model for subsurface strain forecasting, and information relating to the subsurface strain forecasting may be presented on the display. In some implementation, operation 208 may be performed using a component the same as or similar to the display 14 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for estimating strain along a well, the system comprising:
one or more physical processors configured by machine-readable instructions to:
obtain time-strain information of a first well, the time-strain information characterizing time-strain of the first well as a function of distance along the first well, the time-strain of the first well measured via a first interior fiber optic cable within the first well, wherein the first well is adjacent to one or more types of rock, the one or more types of rock including a first type of rock;
obtain velocity-strain per strain information for the first well, the velocity-strain per strain information characterizing one or more values of velocity-strain per strain corresponding to the one or more types of rock adjacent to the first well, the one or more values of velocity-strain per strain including a first value of velocity-strain per strain corresponding to the first type of rock adjacent to the first well, wherein the first value of velocity-strain per strain is determined based on fiber optic measurement of time-strain and strain of a second well different from the first well; and
estimate the strain of the first well as the function of distance along the first well based on (1) the time-strain of the first well as the function of distance along the first well and (2) the one or more values of velocity-strain per strain corresponding to the one or more types of rock adjacent to the first well, wherein the strain of the first well adjacent to the first type of rock is estimated based on the time-strain of the first well along the first type of rock and the first value of velocity-strain per strain corresponding to the first type of rock;
wherein:
an exterior fiber optic cable is positioned outside a casing of the second well;
the exterior fiber optic cable is coupled to the first type of rock adjacent to the second well; and
the strain of the second well is measured via the exterior fiber optic cable.

2. The system of claim 1, wherein the exterior fiber optic cable is coupled to the first type of rock adjacent to the second well via cementing of the exterior fiber optic cable between the casing of the second well and the first type of rock adjacent to the second well.

3. The system of claim 1, wherein the time-strain of the second well is measured via the exterior fiber optic cable.

4. The system of claim 1, wherein the time-strain of the second well is measured via a second interior fiber optic cable within the second well.

5. The system of claim 1, wherein one or more fiber optic strain sensors are positioned at one or more locations along the exterior fiber optic cable, the one or more fiber optic strain sensors configured to measure helical strain at the one or more locations along the exterior fiber optic cable.

6. The system of claim 1, wherein the first interior fiber optic cable is positioned within a casing of the first well.

7. The system of claim 6, wherein the first interior fiber optic cable is clamped to a tubing of the first well.

8. The system of claim 1, wherein a mechanical earth model is calibrated or verified for subsurface strain forecasting based on the strain of the first well.

9. The system of claim 1, wherein the first well does not include an exterior fiber optic cable coupled to the one or more types of rock adjacent to the first well.

10. A method for estimating strain along a well, the method comprising:
obtaining time-strain information of a first well, the time-strain information characterizing time-strain of the first well as a function of distance along the first well, the time-strain of the first well measured via a first interior fiber optic cable within the first well, wherein the first well is adjacent to one or more types of rock, the one or more types of rock including a first type of rock;
obtaining velocity-strain per strain information for the first well, the velocity-strain per strain information characterizing one or more values of velocity-strain per strain corresponding to the one or more types of rock adjacent to the first well, the one or more values of velocity-strain per strain including a first value of velocity-strain per strain corresponding to the first type of rock adjacent to the first well, wherein the first value of velocity-strain per strain is determined based on fiber optic measurement of time-strain and strain of a second well different from the first well; and
estimating the strain of the first well as the function of distance along the first well based on (1) the time-strain of the first well as the function of distance along the first well and (2) the one or more values of velocity-strain per strain corresponding to the one or more types of rock adjacent to the first well, wherein the strain of the first well adjacent to the first type of rock is estimated based on the time-strain of the first well along the first type of rock and the first value of velocity-strain per strain corresponding to the first type of rock;
wherein:
an exterior fiber optic cable is positioned outside a casing of the second well;
the exterior fiber optic cable is coupled to the first type of rock adjacent to the second well; and
the strain of the second well is measured via the exterior fiber optic cable.

11. The method of claim 10, wherein the exterior fiber optic cable is coupled to the first type of rock adjacent to the second well via cementing of the exterior fiber optic cable between the casing of the second well and the first type of rock adjacent to the second well.

12. The method of claim 10, wherein the time-strain of the second well is measured via the exterior fiber optic cable.

13. The method of claim 10, wherein the time-strain of the second well is measured via a second interior fiber optic cable within the second well.

14. The method of claim 10, wherein one or more fiber optic strain sensors are positioned at one or more locations along the exterior fiber optic cable, the one or more fiber optic strain sensors configured to measure helical strain at the one or more locations along the exterior fiber optic cable.

15. The method of claim 10, wherein the first interior fiber optic cable is positioned within a casing of the first well.

16. The method of claim 15, wherein the first interior fiber optic cable is clamped to a tubing of the first well.

17. The method of claim 10, wherein a mechanical earth model is calibrated or verified for subsurface strain forecasting based on the strain of the first well.

18. A system for estimating strain along a well, the system comprising:
- a first well adjacent to one or more types of rock, the one or more types of rock including a first type of rock, the first well including a casing;
- an interior fiber optic cable positioned within the casing of the first well to measure time-strain of the first well; and
- one or more physical processors configured by machine-readable instructions to:
  - obtain time-strain information of the first well, the time-strain information characterizing the time-strain of the first well as a function of distance along the first well, the time-strain of the first well measured via the interior fiber optic cable positioned within the casing of the first well;
  - obtain velocity-strain per strain information for the first well, the velocity-strain per strain information characterizing one or more values of velocity-strain per strain corresponding to the one or more types of rock adjacent to the first well, the one or more values of velocity-strain per strain including a first value of velocity-strain per strain corresponding to the first type of rock adjacent to the first well, wherein the first value of velocity-strain per strain is determined based on fiber optic measurement of time-strain and strain of a second well different from the first well, the fiber optic measurement of the strain of the second well performed via an exterior fiber optic cable of the second well; and
  - estimate the strain of the first well as the function of distance along the first well based on (1) the time-strain of the first well as the function of distance along the first well and (2) the one or more values of velocity-strain per strain corresponding to the one or more types of rock adjacent to the first well, wherein the strain of the first well adjacent to the first type of rock is estimated based on the time-strain of the first well along the first type of rock and the first value of velocity-strain per strain corresponding to the first type of rock.

* * * * *